Feb. 9, 1965     F. P. PENDLETON     3,169,038
FILTER CLEANER FOR PULVERIZED MATERIAL CONVEYING SYSTEM
Filed Aug. 29, 1962

INVENTOR
FRANK P. PENDLETON
BY Ernest Greenen
ATTORNEY

United States Patent Office 3,169,038
Patented Feb. 9, 1965

3,169,038
FILTER CLEANER FOR PULVERIZED MATERIAL CONVEYING SYSTEM
Frank P. Pendleton, Montclair, N.J., assignor to Vac-U-Max, Belleville, N.J., a corporation of New Jersey
Filed Aug. 29, 1962, Ser. No. 220,272
9 Claims. (Cl. 302—59)

The present invention relates to the pneumatic conveying of particles, and, more particularly, to cleaning the filter of a system or device for conveying fluent material wherein negative pressure, suction, or vacuum is created for entraining the material and conveying the same to a receptacle.

An example of such a system is disclosed in my prior United States Patent No. 2,992,858, dated July 18, 1961, which system generally comprises a closed receptacle to which the material is conveyed having an inlet for the material and an air outlet adjacent the upper end thereof, vacuum creating means such as a gas or steam operated ejector pump or the like having an air entraining intake in fluid flow connection with the receptacle outlet, and a filter such as porous fabric or the like disposed between the outlet and the intake for allowing air to pass freely therethrough and for preventing particles of the material from being entrained into the vacuum creating means.

In the operation of such systems, it has been found that the suction on the downstream side of the filter causes particles of the material to adhere to the upstream side of the filter and close the pores of the filter, whereby the flow of air through the filter is materially impeded and the effectiveness of the system to convey the material is decreased. In handling extremely fine dust-like material, the material is adhered more tenaceously to the filter and builds up a cake or coating thereon very rapidly which impairs the material conveying effectiveness of the system within a short period of time. In some instances, it has been found that the nature of the material being conveyed is such whereby, after the receptacle has been filled once, the filter becomes heavily coated and makes further effective operation of the system almost impossible.

Accordingly, an object of the present invention is to provide a simple, practical, reliable and economical arrangement for removing the adhered particles from the filter to clean the same.

Another object is to provide such an arrangement which can be controlled manually or automatically.

A further object is to provide such an arrangement wherein cleaning of the filter is effected automatically at the end of each cycle of operation of the system, that is, each time a batch of material has been conveyed to the receptacle.

A still further object is to provide such an arrangement wherein a minimum of simple and more or less conventional mechanisms are employed to effect automatic, periodic operation.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, it has been discovered that the filter can be cleaned quickly and effectively by shutting off the inlet of the receptacle and continuing evacuation of the receptacle to create a high vacuum within the receptacle, and then suddenly rendering the vacuum creating means completely ineffective whereby air entering the air outlet of the receptacle from atmosphere rushes in reverse through the filter and into the evacuated space within the receptacle to remove the adhered particles of the material from the filter. The effectiveness of this manner of cleaning the filter is enhanced by constructing the filter of flexbile or yieldable fabric which is adapted to respond to the impact of the surge of air and first dislodge the cake or coating of particles and then have its pores cleaned by the rush of air therethrough.

A preferred embodiment of the invention has been chosen for purposes of illustration and description, and is shown in the accompanying drawing, forming a part of the specification, wherein.

Figure 1:
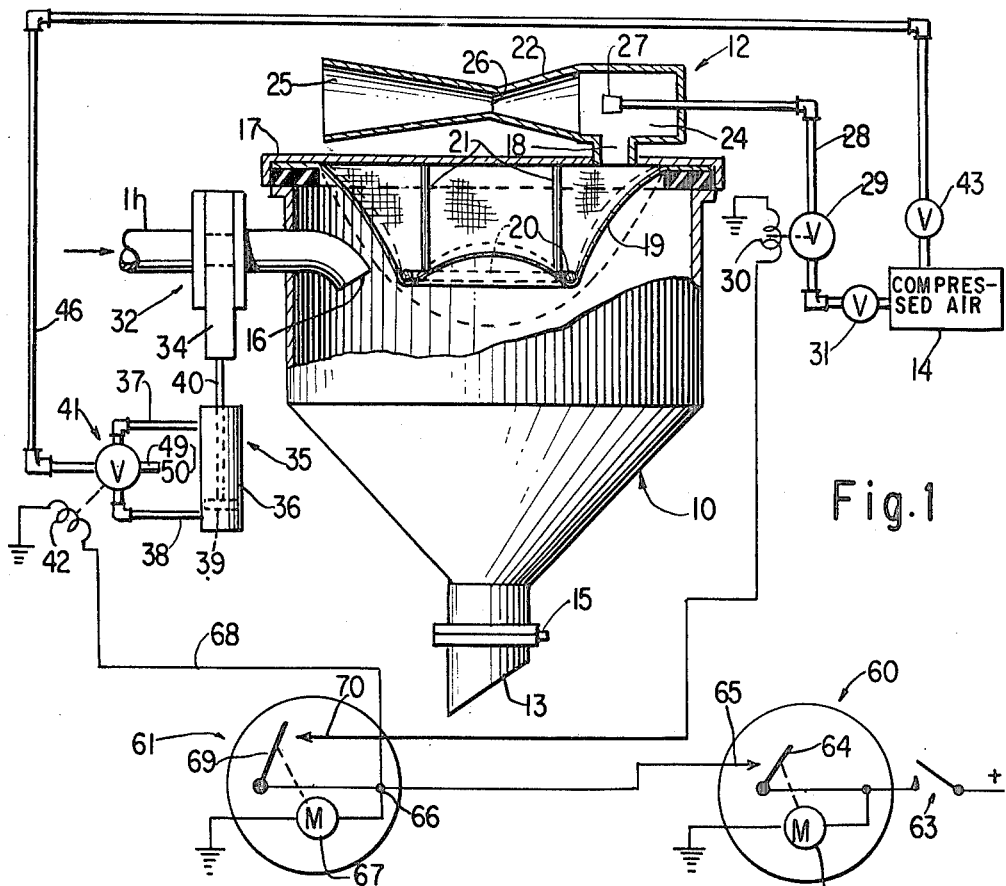
FIG. 1 is a schematic longitudinal sectional view of the receptacle for receiving the conveyed material and a simplified air flow and electrical wiring diagram of a system in accordance with the present invention.

Referring to FIG. 1 of the drawing in detail, a system is illustrated which generally comprises a closed receptacle 10 for receiving a batch of fluent pulverized material by way of a pipe 11, compressed air operated vacuum creating apparatus 12, a source of compressed air 14, a source of electrical energy (not shown) connected between plus and ground, and electric and pneumatic valve control mechanism described herinafter in detail.

The receptacle 10 may be in the form of a hopper having a valved, material discharging outlet 13 at its lower end provided with a valve 15 or may be a drum or barrel into which the material is to be conveyed. The receptacle has an inlet 16 adjacent its upper end through which the material is conveyed by the pipe 11 and has a substantially airtight cover or closure 17 at its upper end which is formed with an air outlet 18. The receptacle 10 is closed in the sense that the controlled inlet 16 and outlets 13 and 18 are the only openings therein for the entry and/or discharge of air and fluent material.

As already indicated, a filter 19 is disposed between the inlet 16 and the outlet 18 of the receptacle 10 to prevent fluent material from entering the outlet 18 and to allow air to flow freely therethrough. Such a filter, as shown herein, may be constructed of porous fabric and is in the general shape of a bag having its periphery supported at the upper end of the receptacle and being held downwardly within the receptacle by a horizontal ring 20 secured to the underside of the cover 17 by vertical rods 21.

The compressed air operated vacuum creating apparatus 12 is an ejector pump mounted on the cover 17 which comprises a venturi 22 having an air intake section 24 coupled in fluid flow communication with the receptacle air outlet 18, an outlet section 25 in communication with the atmosphere and a throat 26 between the inlet and outlet sections; a nozzle 27 for directing compressed air into the inlet section whereby air is entrained from the receptable by way of the outlet 18 to produce a vacuum in the receptacle; and pipe 28 connecting the nozzle 27 to the source of compressed air 14. A normally closed valve 29, operated by a solenoid 30, is connected in the pipe 28, and a master valve 31 is connected in the pipe 28 upstream of the valve 29 to control the supply of compressed air to the nozzle 27 for the purpose described hereinafter.

The pipe 11 has a normally open valve 32 connected therein adapted to be closed when a batch of fluent material has been delivered to the receptacle 10, whereby a high vacuum is established in the receptacle upon continued evacuation of the receptacle by the apparatus 12. As shown herein, the valve has a slidable gate 34 which is moved by air operated mechanism 35 to control the flow of material through the pipe and the opening and closing of the receptacle inlet 16.

The mechanism 35 comprises a cylinder 36 having a port 37 at its upper end and a port 38 at its lower end, a piston 39 in the cylinder 36 having a rod 40 for connecting it to the valve gate 34, valving 41 (FIGS. 2 and 3) for connecting one of the cylinder ports to the compressed air source and other to atmosphere and vice versa, and a solenoid 42 for actuating the valving 41.

Figures 2, 3:
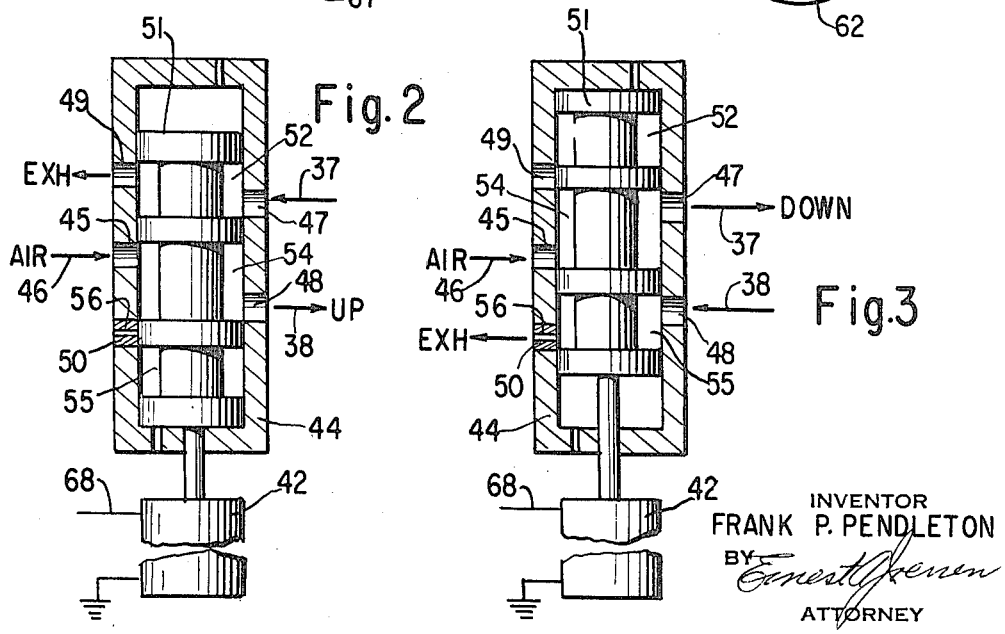
FIGS. 2 and 3 are enlarged schematic sectional views of a valve for controlling the opening and closing of the inlet of the receptacle.

As shown in FIGS. 2 and 3, the valving 41 comprises a cylinder 44 having an air inlet port 45 connected by a pipe 46 (FIG. 1) to the air source 14, a master valve 43 in the pipe 46, a port 47 connected to the upper cylinder port 37, a port 48 connected to the lower cylinder port 38 and exhaust ports 49 and 50; and a slidable control member 51 in the cylinder actuated by the solenoid 42 and having a passageway 52 for establishing communication between the ports 47 and 49, a passageway 54 for alternatively connecting the ports 47 and 48 to the air inlet port 45 and a passageway 55 for establishing communication between the ports 48 and 50.

When the valve 32 is in its open position, the valving control member 51 is in the position shown in FIG. 2, the gate 34 is down and the piston 39 is at the lower end of the cylinder. The solenoid 42 upon being energized is effective to move the control member 51 to the position shown in FIG. 3, whereby the lower cylinder port 38 is connected to the air inlet port 45 by way of the port 48 and the passageway 54 and the upper cylinder port 37 is connected to the exhaust port 49 by way of the port 47 and the passageway 52 so that the piston 39 and the valve gate 34 are moved upwardly to close the valve 32. Upon de-energizing the solenoid 42, the valving control member 51 is returned to the position shown in FIG. 2, whereby the upper cylinder port 37 is connected to the air inlet port 45 by way of the port 47 and the passageway 54 and the lower cylinder port 38 is connected to the exhaust port 50 by way of the passageway 55 so that the piston 39 and the valve gate 34 are moved downwardly to open the valve 32.

Preferably, for the purpose described hereinafter, the valve 32 is held closed until next operating period. This may be accomplished by providing a flow restricting orifice 56 in the exhaust port 50. If desired, means (not shown) may be provided for adjusting the area of the orifice to control the delay before the valve 32 reopens.

As shown in FIG. 1, the solenoids 30 and 42 are connected in an electrical timing network which includes a master timer 60 and a reset timer 61.

The purpose of the master timer 60 is to control the duration of time required to deliver a predetermined amount of fluent material to the receptacle 10, and to start the reset timer. This timer essentially comprises a clockwork motor 62, and a switch driven by the motor having a switch arm 64 connected to plus at one end through a switch 63 and having a contact 65 adapted to be engaged by the other end of the arm when the duration of time expires.

The purpose of the reset timer 61 is to energize the solenoid 42 to close the valve 32, to delay the operation of the solenoid 30 to close the valve 29 whereby the vacuum creating means 12 are effective for an interval of time after the valve 32 has been closed and the receptacle 10 is highly evacuated, and to operate the solenoid 42 to reopen the valve 32 after atmosphere air has entered the outlet 18 of the receptacle.

In order to accomplish this, the timer 61 comprises a terminal 66 connected to the contact 65 of the master timer 60, a clockwork motor 67 connected between the terminal 66 and ground, a connection 68 from the terminal 66 to one side of the solenoid 42 which has its other side connected to ground, and a switch driven by the motor 67 having a switch arm 69 connected to the terminal 66 at one end of the arm 69 when the delay time expires. The contact 70 is connected to one side of the solenoid 30 which has its other side connected to ground.

The timer 61 may be of the automatically resetting type such as a Model No. 81 Reset Timer which can be purchased from Hagen Manufacturing Co., Baraboo, Wisconsin.

In operation, when the system is idle, the valve 15 and the master valves 31 and 43 are shut, the switch 63 is open, the switch arm 64 is off its contact 65 whereby the solenoid 42 is de-energized and the valving 41 is positioned to cause the mechanism 35 to hold the valve 32 open (FIG. 2), and the switch arm 69 is off its contact 70 whereby the solenoid 30 is de-energized to hold the valve 29 open. After adjusting the timers 60 and 61, the system is put into operation by opening the master valves 31 and 43, and closing the switch 63. Compressed air will now be delivered to the vacuum creating means 12 to vacuumize the receptacle 10, and to the mechanism 35 to hold the valve 32 open, whereby material will be conveyed into the receptacle 10; and the motor 62 will be energized to control the master timer 60.

When a desired amount of material has been delivered to the receptacle 10, the switch arm 64 has been moved by the motor 62 to engage the contact 65. This causes the solenoid 42 to be energized to position the valving 41 (FIG. 3) to operate the mechanism 35 to close the valve 32, and energizes the motor 67 to control the timer 61. The vacuum creating means 12 remain effective and create a high vacuum within the receptacle 10 because the valve 32 is closed.

After this desired vacuum has been created, the switch arm 69 has been moved by the motor 67 to engage the contact 70, whereby the solenoid 30 is energized to close the valve 29 to render the vacuum creating means 12 ineffective. As this occurs, atmospheric air rushes or surges into the receptacle 10 by way of the venturi passages 24, 25 and 26 and the receptacle opening 18, whereby the filter is first flexed by the impact of the inrush of air to shake off the cake or coating of material on the underside thereof and air then passes through the filter to clean the pores thereof.

From the foregoing description, it will be seen that the present invention provides an improved system of the general type indicated herein which effects rapid and efficient cleaning of the filter to maintain the system in proper working order. This is accomplished in a practical, reliable and economical manner.

While the present invention has been described by way of example in connection with a pneumatic conveying system operated by an ejector pump, it will be understood that it is applicable to vacuum cleaners and other systems and devices wherein cleaning of the filter is desirable and that mechanically operated vacuum creating means such as exhaust fans or blowers could be employed to operate such devices or systems. Also, it will be understood that other commercially available types of timing controls could be employed, and fluid pressure operated devices could be utilized instead of solenoids for opening and closing the valves.

Thus, as various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a system for conveying a dense stream of fluent particles of material, the combination of a closed receptacle for receiving a desired amount of the material, said receptacle having a side wall provided with an inlet near the upper end thereof for the material, a cover provided with an air outlet, and a valve controlled discharge opening at the bottom thereof adapted to be opened at will to discharge the entire contents of said receptacle; a filter bag having its periphery sealed to the underside of said cover to surround said air outlet and depending into said receptacle, said bag being formed of a flexible porous material to cause the same to be drawn upwardly by air leaving said outlet, said bag being positioned between said inlet and said outlet for preventing the material from entering said outlet; a frame extending downwardly from the underside of said cover for holding said bag downwardly within said receptacle and out of contact with said air outlet; vacuum creating means connected in fluid flow communication with said outlet and having a passageway in fluid flow communication with the atmosphere; a control device for rendering said vacuum creating means effective and for rendering said vacuum creating means ineffective and allowing the flow of air from the atmosphere to said receptacle outlet and through said filter bag and into said receptacle, and a valve for closing said receptacle inlet while said vacuum creating means are effective to provide a high vacuum within said receptacle, whereby, upon rendering said vacuum creating means ineffective and allowing the flow of air from the atmosphere to said receptacle outlet, the rush of air caused by the high vacuum in said receptacle drives the bag down to shake off material adhered thereto, rushes through said filter bag and is effective to remove material adhering to said filter bag.

2. In a system according to claim 1, including control means for first closing said valve and thereafter operating said vacuum creating a control device to render said vacuum creating means ineffective.

3. In a system according to claim 1, including control means comprising means for operating said means for rendering said vacuum creating means effective and ineffective, means for operating said valve to open and close the same, and timing means for first causing said valve operating means to close said valve and for causing said vacuum creating means to be rendered ineffective after an interval of time has expired.

4. In a system according to claim 2, wherein said valve operating means includes means for delaying the opening of said valve.

5. In a system according to claim 1, wherein said control means for rendering said vacuum creating means effective and ineffective includes a valve for said receptacle inlet; first mechanism comprising a cylinder having a port at each end thereof, a piston in said cylinder connected to said valve for opening and closing the same; second mechanism; and valving including an inlet port for medium under pressure, a pair of exhaust ports, and a control member for alternatively connecting said inlet port to one of said cylinder ports and connecting the other said cylinder port to one of said exhaust ports.

6. In a system according to claim 5, wherein said valve has a slidable gate operated by said piston for opening and closing said receptacle inlet.

7. In a system according to claim 5, wherein said exhaust port which is connected to a cylinder port when said control member is positioned to effect opening of said valve is provided with a flow restricting orifice for delaying the opening of said valve.

8. In a system according to claim 5, wherein said control means include means for causing said second mechanism to be operated to render said vacuum creating means ineffective in response to operation of said first mechanism to close said valve.

9. In a system according to claim 8, wherein said control means include means for delaying the opening of said valve.

References Cited in the file of this patent
UNITED STATES PATENTS

| | | |
|---|---|---|
| 1,113,024 | Lechtenberg | Oct. 6, 1914 |
| 1,729,527 | Tilgen | Sept. 24, 1929 |
| 1,764,861 | Van Gelder | June 17, 1930 |
| 1,772,881 | Tolman | Aug. 12, 1930 |
| 2,276,805 | Tolman | Mar. 17, 1942 |